June 16, 1931.  F. R. HARRIS, JR  1,810,044
SCREEN FOR WINDSHIELDS
Filed June 11, 1930
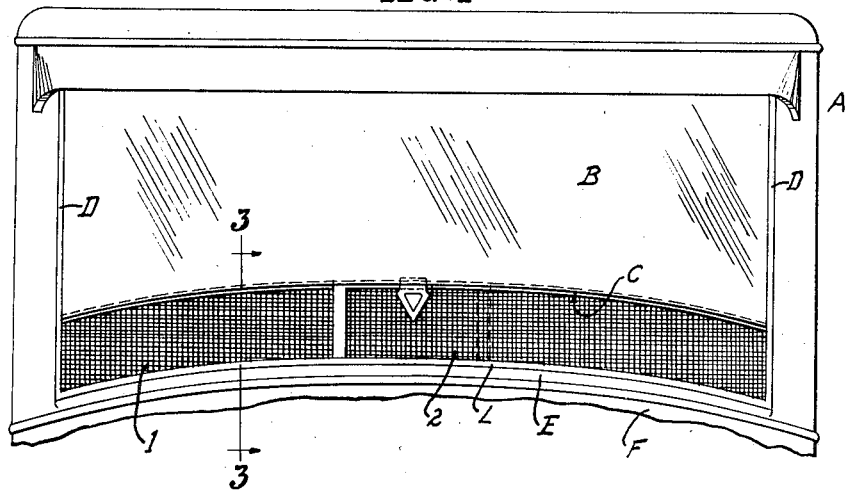
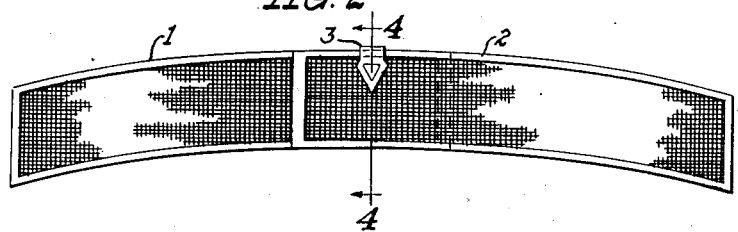
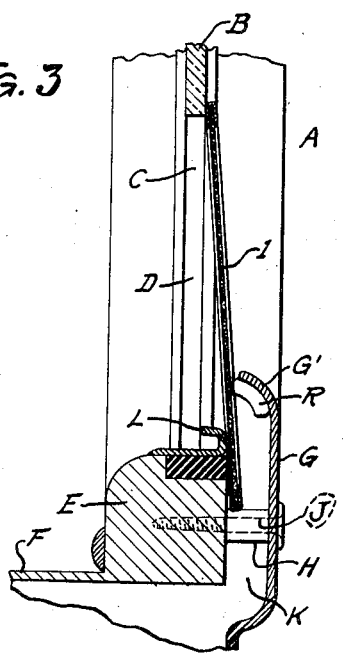
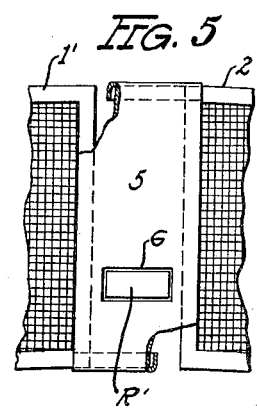
INVENTOR
F. R. HARRIS JR.
BY
ATTORNEY Patented June 16, 1931

1,810,044

UNITED STATES PATENT OFFICE

FRANK REID HARRIS, JR., OF ST. LOUIS, MISSOURI

SCREEN FOR WINDSHIELDS

Application filed June 11, 1930. Serial No. 460,401.

This invention relates to a novel form of screen, especially designed for use in connection with windshields of motor vehicles, the primary object of the invention being to provide improved screen means for guarding the space between the lower edge of the windshield and the cowl or frame with relation to which the windshield moves, when the windshield is in an open position.

A further important object of the invention is to provide a device of this character which is of such improved construction that the screen may be readily and easily positioned in place without employing fastening devices of any sort, and without preparing the motor vehicle in any manner to receive the screen.

Fig. 1 is a fragmentary front elevation showing a motor vehicle equipped with my improved windshield screen.

Fig. 2 is a front elevation of the screen apart from a motor vehicle.

Fig. 3 is an enlarged section on line 3—3 of Fig. 1.

Fig. 4 is an enlarged section on line 4—4 of Fig. 2.

Fig. 5 is a fragmentary front elevation of a modified form of the screen.

In the drawings, wherein is shown for the purpose of illustration, merely, one embodiment of the invention, A designates a motor vehicle of conventional design which includes a windshield B. The windshield B is of the one-piece type and is arranged for vertical movement to provide a space C between the lower edge of the windshield and the lower portion of the frame or support by which the windshield is supported, and to this end the frame or support of the windshield is provided with oppositely disposed guideways D (Fig. 3) in which the windshield B operates.

Many automobile bodies, notably those known as "Fisher bodies," are constructed at the lower portions of windshields as shown generally in Fig. 3 of the drawings; that is to say, these bodies include curved members E which extend transversely of the motor vehicle body and constitute the lower member of the frame of the windshield. The cowl F extends outwardly from the transverse member E, and a dash board element G is secured to the transverse member E at the inner side thereof. The dash board element G is spaced from the transverse member E by tubular spacers H through which fastening devices J, which secure the dash board element G to the transverse element E, pass, and the space K so provided between the member E and element G serves as a ventilating passageway through which air passes to the lower portion of the interior of the motor vehicle when the windshield is open. Fixed to the upper face of the transverse member E is a sealing device L into contact with which the windshield B passes when same is lowered to its closed position.

Ordinarily a motor vehicle body includes a plurality of fastening devices J and spacers H, the number thereof usually being greater than three, and said fastening devices and spacers are spaced longitudinally of the transverse member E. Also, usually the dash board element G is provided with an upper portion G', which is curved toward the windshield B, and this curved portion is provided with a block R of rubber or like material, which is located at the approximate longitudinal center of the dash board element G and is intended to prevent undue rattling of the windshield when same is in a lowered position and the motor vehicle is being operated.

My improved windshield screen comprises a pair of screen sections 1 and 2, which are arranged with their inner end portions in overlapping relation with respect to each other, as shown in Figs. 1 and 2. Each screen section comprises a marginal frame formed of suitable material which engages and grips the marginal edge of the screening, so that a unitary structure is provided, and as shown clearly in Figs. 1 and 2, the upper and lower portions of the marginal frames of the screen sections 1 and 2 are curved to correspond to the curvature of the lower edge of the windshield B and the transverse member E of the windshield frame. The overlapping portions of the screen sections 1 and 2 are held together by a clip 3 formed of metal or other suitable material which is possessed of considerable resiliency or spring, so that said clips may be passed over the upper edge portions of the overlapping portions of the screen sections in a manner to properly hold said sections together while permitting longitudinal adjustment of the screen sections relative to each other.

In applying my improved windshield screen to a motor vehicle, the lower portion of the screen is passed downwardly in to the space K until the lower edge of the screen rests upon the spacers H associated with the spaced apart fastening devices J. When the screen is in the position referred to, it is arranged at a slight angle, the lower edge of said screen being located rearwardly of the top edge, as shown in Fig. 3, and the forward face of the screen contacts closely with the rear edge of the sealing device L. Also, during such position of the screen the block of rubber R is in firm contact with the rear face of the screen and the upper edge portions of the screen is arranged in contact with the inner face of the windshield B, as shown in Fig. 3. This results in the screen being wedged in place by elements which contact therewith at three separated points, whereby said screen is very securely held in place without fastening devices of any sort or alteration of the construction of the body of the motor vehicle. The screen, because of its overlapping arrangement, may be adjusted as to length so that it may be used on motor vehicles having windshields of various widths, and because of its arrangement inside of the windshield B instead of beneath said windshield, the windshield may be adjusted to open or closed positions without interference from the screen, and without removing same from its operative position with respect to the windshield.

In some makes of motor vehicles the rubber blocks R associated with the dash board member G extends forwardly to such extent that it would interfere with the proper introduction into place of a screen constructed as illustrated in Figs. 1 to 4, inclusive, and I therefore provide a screen constructed as shown in Fig. 5 for use with these motor vehicles. In this form of the invention the inner end portions of the screen sections 1' and 2' are not arranged in overlapping arrangement with respect to each other, but instead these inner end portions of said screen sections telescope into a connecting element 5, which is shaped, as shown in Fig. 5, to embrace said end portions of the screen sections. The connecting element 5 is provided with an aperture 6 through which the block of rubber R extends, and because of such arrangement interference from the block of rubber in connection with the arrangement of the screen in place is eliminated.

I claim:

1. In combination with a motor vehicle body having a vertically slidable windshield and provided with a transversely arranged member at the lower portion of the windshield support and a dash board element spaced with respect to said transverse member to provide a ventilating space wherein members are arranged which support said dash board element, a screen, with respect to which said windshield is movable, for guarding the space beneath the windshield of the motor vehicle body when said windshield is elevated, the lower portion of said screen being located within said ventilating space and said screen being supported at all times by said supporting members within said ventilating space and having its upper edge in contact with the windshield, said motor vehicle body including a sealing member with respect to which the lower edge portion of the windshield is moved when same is moved to its closed position, and said dash board element having a block of resilient material associated therewith, said sealing member and said block of resilient material being arranged in contact with opposite sides of the screen at points above the lower edge thereof for aiding in the rigid support thereof.

2. In combination with a motor vehicle body having a vertically slidable windshield and provided with a transversely arranged member at the lower portion of the windshield support and a dash board element spaced with respect to said transverse member to provide a ventilating space wherein members are arranged which support said dash board element, a screen, with respect to which said windshield is movable, for guarding the space beneath the windshield of the motor vehicle body when said windshield is elevated, the lower portion of said screen being located within said ventilating space and said screen being supported at all times by said supporting members within said ventilating space and having its upper edge in contact with the windshield, said motor vehicle body including a sealing member with respect to which the lower edge portion of the windshield is moved when same is moved to its closed position, and said dash board element having a block of resilient material associated therewith, said sealing member and said block of resilient material being arranged in contact with opposite sides of the screen at points above the lower edge thereof for aiding in the rigid support thereof, said screen comprising overlapping screen sections, and a clip for slidingly retaining said screen sections together.

3. In combination with a motor vehicle body having a vertically slidable windshield and provided with a transversely arranged member at the lower portion of the windshield support and a dash board element spaced with respect to said transverse member to provide a ventilating space wherein members are arranged which support said dash board element, a screen, with respect to which said windshield is movable, for guarding the space beneath the windshield of the motor vehicle body when said windshield is elevated, the lower portion of said screen being located within said ventilating space and said screen being supported at all times by said supporting members within said ventilating space and having its upper edge in contact with the windshield, said motor vehicle body including a sealing member with respect to which the lower edge portion of the windshield is moved when same is moved to its closed position, and said dash board element having a screen contacting portion associated therewith, said sealing member and said screen contacting portion of said dash board element being arranged in contact with opposite sides of the screen at points above the lower edge thereof for aiding in the rigid support thereof.

In testimony that I claim the foregoing I hereunto affix my signature.

F. REID HARRIS, Jr.